(12) United States Patent
Ichida et al.

(10) Patent No.: US 7,061,228 B2
(45) Date of Patent: Jun. 13, 2006

(54) APPARATUS FOR DETECTING ROTATION OF A BICYCLE PART

(75) Inventors: Tadashi Ichida, Ikoma (JP); Masahiro Yamanaka, Izumisano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/604,888

(22) Filed: Aug. 25, 2003

(65) Prior Publication Data
US 2004/0113608 A1 Jun. 17, 2004

(30) Foreign Application Priority Data
Aug. 28, 2002 (JP) .............................. 2002-249278

(51) Int. Cl.
G01P 3/42 (2006.01)
G01P 3/487 (2006.01)
B62J 6/00 (2006.01)

(52) U.S. Cl. ...................... 324/174; 324/179; 340/432; 73/514.39

(58) Field of Classification Search ................ 324/160, 324/163, 166, 167, 173, 174, 178, 207.2, 324/207.25, 179, 207.21, 207.22; 73/594.1, 73/594.2, 514.39, 493, 494; 74/594.1, 594.2, 74/594.4, 494.2; 284/448; 116/62.1; 340/432, 340/441, 671; 384/448; 180/170
See application file for complete search history.

(56) References Cited

U.S. PATENT DOCUMENTS 4,122,907 A * 10/1978 Davidson et al. ........... 180/206
4,521,731 A * 6/1985 Uyeda et al. ................ 324/174
4,633,216 A * 12/1986 Tsuyama ..................... 340/432
5,067,597 A * 11/1991 Young ..................... 188/181 R
5,246,402 A * 9/1993 Romano ....................... 474/78
5,480,359 A * 1/1996 Tani ............................ 474/160
5,530,344 A * 6/1996 Caillaut et al. .............. 324/174
5,560,266 A 10/1996 Shikimori et al.
5,873,658 A * 2/1999 Message et al. ............. 384/448
5,900,703 A 5/1999 Li
6,047,230 A 4/2000 Spencer et al.
6,162,140 A * 12/2000 Fukuda ......................... 474/70
6,380,731 B1 * 4/2002 Nishimoto ................... 324/173
2001/0011809 A1 * 8/2001 Fukuda ........................ 280/618
2002/0082128 A1 6/2002 Fukuda FOREIGN PATENT DOCUMENTS
EP 831021 A2 3/1998
JP 56-004055 * 1/1981
JP 57-070461 * 4/1982

* cited by examiner

*Primary Examiner*—Bot Ledynh
*Assistant Examiner*—Kenneth J. Whittington
(74) *Attorney, Agent, or Firm*—James A. Deland

(57) ABSTRACT

An apparatus for detecting rotation of a bicycle part comprises a casing member comprising a generally annular body structured to be mounted to the bicycle part so that the annular body is incapable of rotating relative to the bicycle part as the bicycle part rotates in opposite directions around a rotational axis. The annular body includes a plurality of circumferentially disposed exposed magnet mounting portions that are concentric with respect to the rotational axis, and a cover member is detachably mounted to the annular body for blocking the plurality of magnet mounting portions.

22 Claims, 8 Drawing Sheets

APPARATUS FOR DETECTING ROTATION OF A BICYCLE PART

BACKGROUND OF INVENTION

The present invention is directed to bicycles and, more particularly, to an apparatus for detecting rotation of a bicycle part.

It is known to mount a rotation detecting apparatus to detect the rotation of a wheel or crank arm so that a cycle computer may use the detected rotations to calculate and display the bicycle speed or pedal cadence to the rider. A conventional rotation detecting apparatus typically comprises a magnet mounted to a rotating part and a magnetic sensor mounted to a fixed part such as the bicycle frame. The magnetic sensor may comprise a reed switch, a Hall-effect element, etc., and it usually is mounted in a position that faces the magnet at some time during rotation of the bicycle part. For example, when used to calculate bicycle speed, the magnet may be mounted to the spoke of a wheel, and the magnetic sensor may be mounted to the front fork. When used to calculate pedal cadence, the magnet may be mounted to the crank arm, and the magnetic sensor may be mounted to either the seat tube or the down tube of the bicycle frame.

Only one magnet is mounted to the rotating part in a conventional apparatus, so the magnetic sensor outputs a detection signal one time for each rotation of the rotating part. Recently, the results of these detections have been used in gear control or suspension control. In such applications, there are instances when a detection cycle of one detection signal per rotation is inadequate to properly control the intended device. This is especially true when the rotating part is rotating at low speed, in which case the detection cycle is too long to adequately control a device that requires rapid response to changing conditions.

One attempt to solve this problem involves installing a plurality of circumferentially spaced magnets on the rotating part. For example, a plurality of magnets may be mounted to selected spokes of a wheel, thereby shortening the detection cycle and speeding up the response to the changing conditions. In such an apparatus, the plurality of magnets and the magnetic sensor must be mounted one by one to the rotating part. Furthermore, the circumferential spacing and radial position of the magnets must be adjusted one by one as they are mounted. Thus, the installation of the plurality of magnets and the magnetic sensor becomes troublesome. Even after the installation is complete, adjustment of the plurality of magnets or the magnetic sensor must be repeated whenever the plurality of magnets and/or the magnetic sensor shifts out of position due to the loosening of the mounting screws or the like.

SUMMARY OF INVENTION

The present invention is directed to various features of an apparatus for detecting rotation of a bicycle part. In one embodiment, the apparatus comprises a casing member comprising a generally annular body structured to be mounted to the bicycle part so that the annular body is incapable of rotating relative to the bicycle part as the bicycle part rotates in opposite directions around a rotational axis. The annular body includes a plurality of circumferentially disposed exposed magnet mounting portions that are concentric with respect to the rotational axis, and a cover member is detachably mounted to the annular body for blocking the plurality of magnet mounting portions. Additional inventive features will become apparent from the description below, and such features alone or in combination with the above features may form the basis of further inventions as recited in the claims and their equivalents.

DETAILED DESCRIPTION

Figure 1:
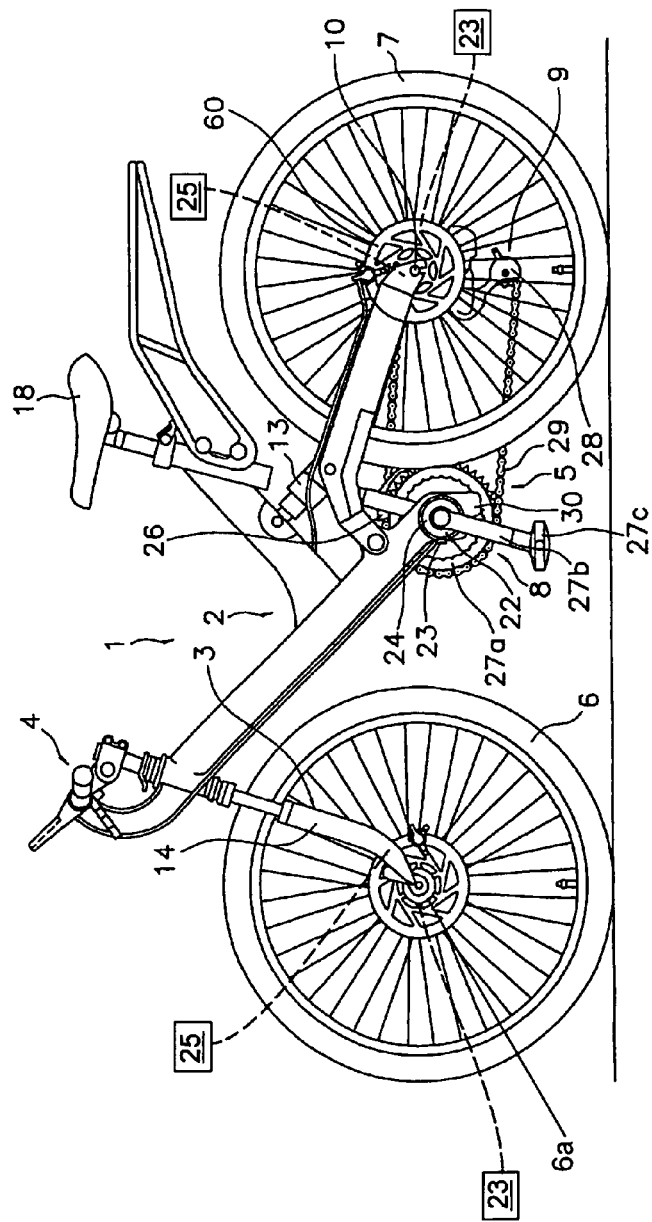
FIG. 1 is a side view of a bicycle including an apparatus for detecting rotation of a bicycle part.

FIG. 1 is a side view of a bicycle including a particular embodiment of an apparatus in the form of a rotation detector 22 for detecting rotation of a bicycle part. In this embodiment, the bicycle is a mountain bicycle comprising a frame 1 having a tubular frame body 2; a front fork 3 mounted to the front of frame body 2 for rotation around an inclined axis; a front wheel 6 rotatably mounted to front fork 3; a handlebar assembly 4 mounted to the upper portion of front fork 3; a rear wheel 7 rotatably mounted to a hub dynamo 10 at the rear portion of frame body 2, a driving portion 5 comprising front and rear gear-shift mechanisms 8 and 9; and a controller 11 (FIG. 6) for controlling the front and rear gear-shift mechanisms 8 and 9. A front suspension 14 is mounted to front fork 3, a rear suspension 13 is mounted to the rear of frame body 2, and a saddle 18 is mounted to the middle of frame body 2.

Figure 2:
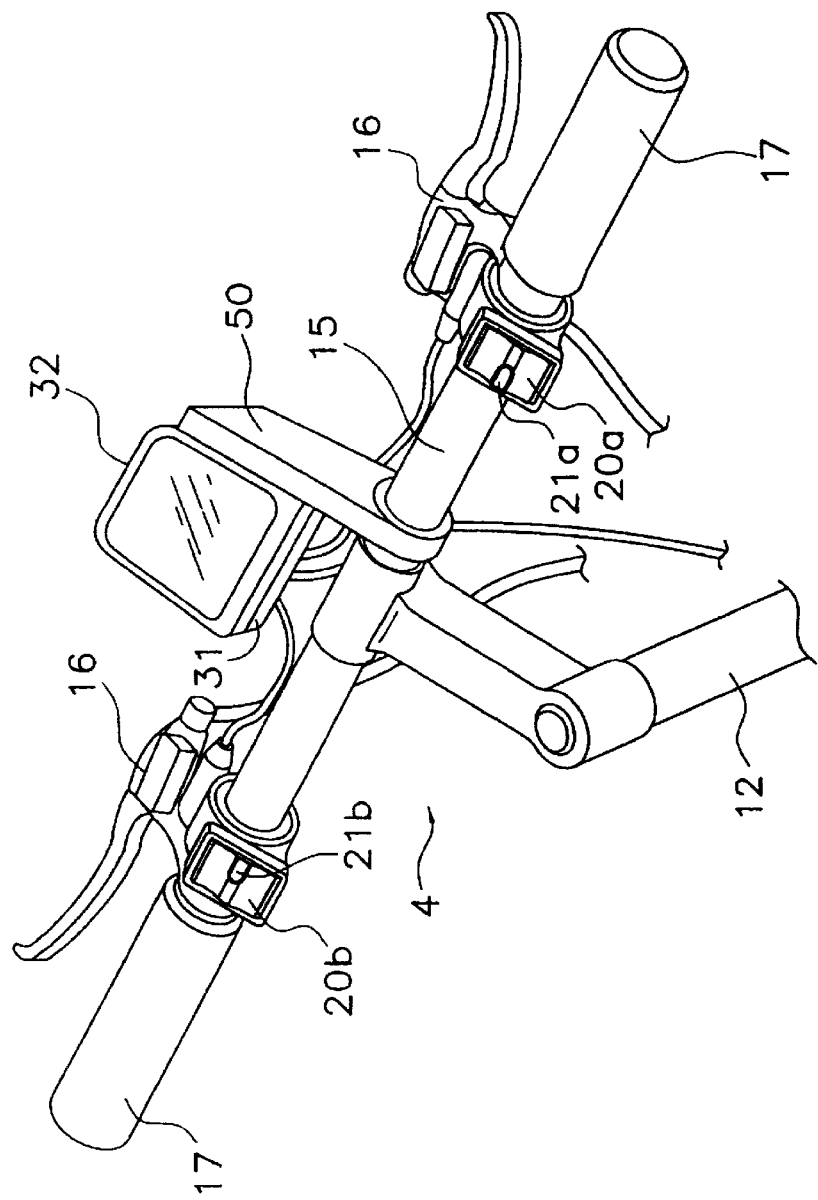
FIG. 2 is an enlarged oblique view of the bicycle handlebar assembly.

As shown in FIG. 2, handlebar assembly 4 comprises a handle stem 12 and a handlebar 15, wherein handle stem 12 is fastened to the upper portion of the front fork 3, and handlebar 15 is fastened to handle stem 12. Brake levers 16 and grips 17 are mounted at opposite ends of the handlebar 15. Gear-shift switches 20a and 20b are provided for carrying out manual gear-shift operations of the front and rear gear-shift mechanisms 8 and 9. An operating switch 21a is provided for switching between an automatic mode and a manual mode of operation, and an operating switch 21b is provided for manually adjusting the stiffness of the front and rear suspensions 13 and 14.

Front gear-shift mechanism 8 comprises a right side crank arm 27a and a left side crank arm 27b mounted to a crankshaft 66 (FIG. 3) that is rotatably mounted within a bottom bracket portion 65 of frame body 2. Pedals 27c are mounted to the distal ends of right side crank arm 27a and left side crank arm 27b. A plurality of front sprockets (e.g., three sprockets) are mounted to crank arm 27a, and a front derailleur 26 is mounted to frame body 2 in close proximity to crank arm 27a for switching a chain 29 among the plurality of front sprockets. Rear gear-shift mechanism 9 comprises a plurality of rear sprockets (e.g., nine sprockets), and a rear derailleur 28 is mounted to the rear of frame body 2 for switching chain 29 among the plurality of rear sprockets 27.

The hub dynamo 10 mounted to rear wheel 7 is adapted to mount a brake disc 60 and a freewheel to which the plurality of rear sprockets is mounted. An alternating current generator 19 (FIG. 6) is mounted inside the hub for generating power according to the rotation of the rear wheel 7.

A rotation detector 22 is mounted to the left crank arm 27b for detecting the rotation of the crank arm. In this embodiment, the rotation detector 22 is used to control the operation of the front and rear externally mounted gear-shift mechanisms 8 and 9, since it is preferable that the gear-shift mechanisms be operated only when the crank arm is rotating. The signals from rotation detector 22 also may be used to calculate and display cadence.

Figure 3:
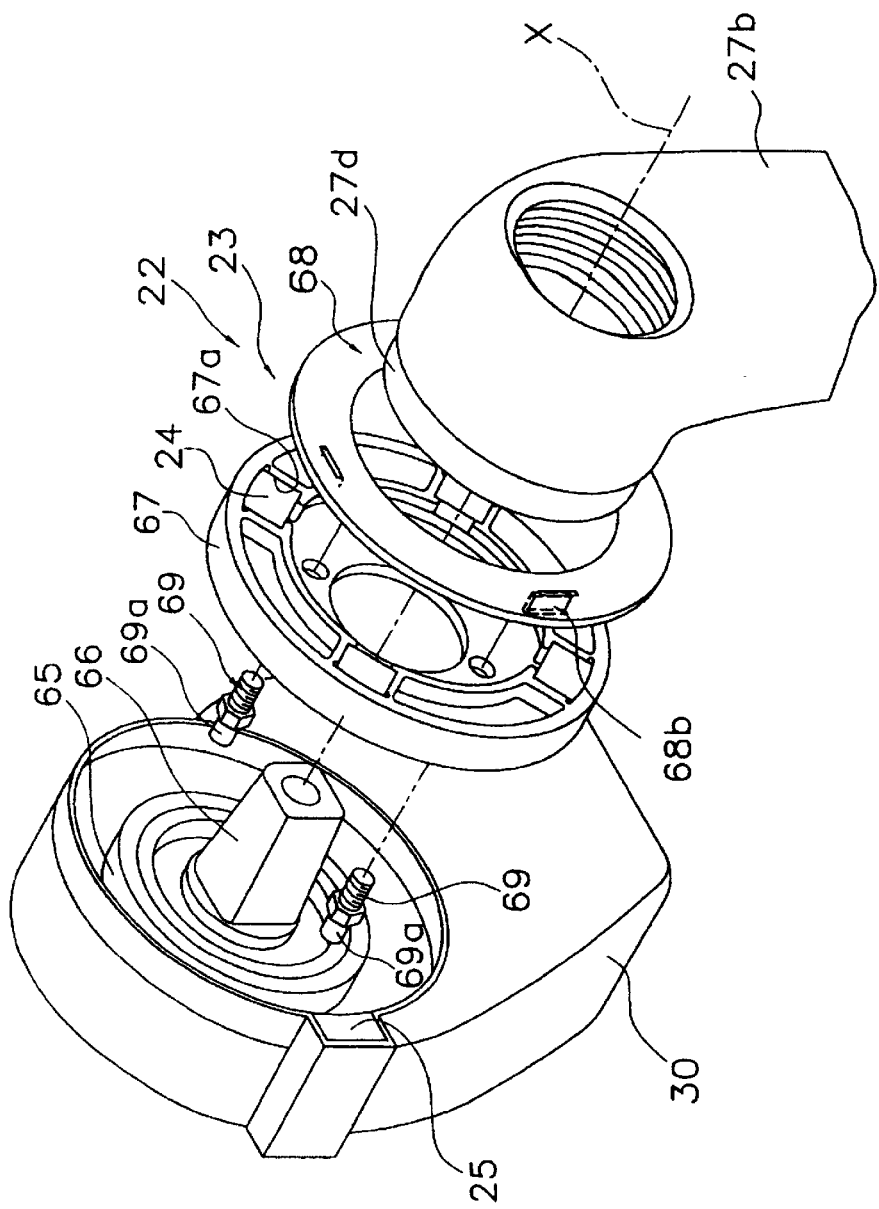
FIG. 3 is an exploded view of a particular embodiment of an apparatus for detecting rotation of a bicycle part.

As shown in FIG. 3, the rotation detector 22 comprises, for example, a synthetic resin casing member 23 structured to be mounted to a crank axle mounting boss 27d of left crank 27b; four evenly spaced magnets 24 circumferentially disposed in the casing member 23 and located concentrically with respect to a rotational axis X of the left crank arm 27b and crankshaft 66; and a magnetic sensor such as a reed switch 25 mounted to the bottom bracket portion 65 of the frame body 2 for detecting the magnetic signals from the plurality of magnets 24.

Figure 4:
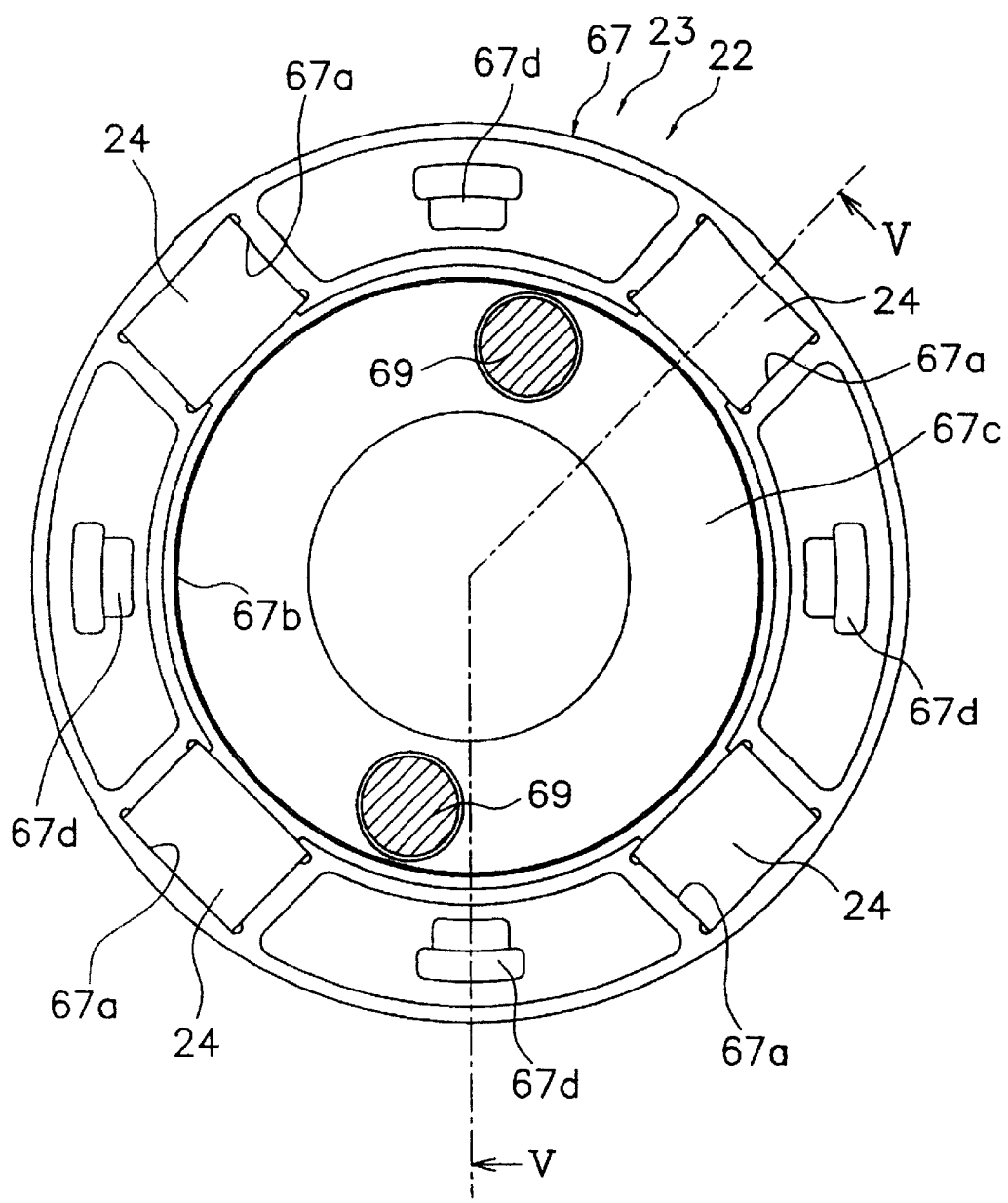
FIG. 4 is a front view of a casing member with a cover removed.
Figure 5:
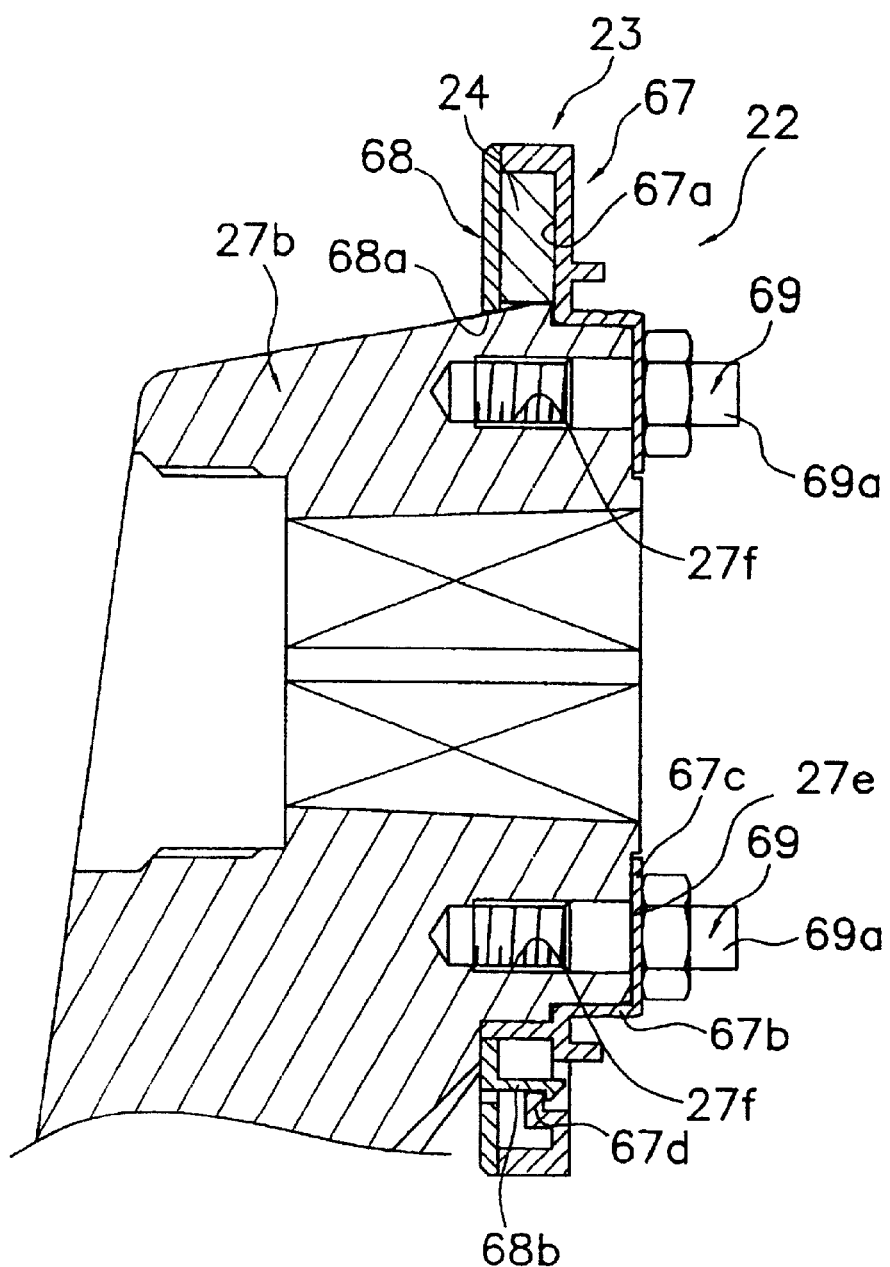
FIG. 5 is a view taken along line V—V in FIG. 4.

As shown in FIGS. 3–5, the casing member 23 comprises a generally cylindrical annular body 67 and a cover member 68. In this embodiment, annular body 67 is nonrotatably and axially immovably mounted to crank axle mounting boss 27b, and cover member 68 is detachably mounted to the casing body 67. Annular body 67 has a tube portion 67b mounted to crank axle mounting boss 27d and a ring portion 67c integrally formed at the edge of the tube portion 67b. The tube portion 67b has magnet storage portions 67a in the form of bottomed bores for storing rectangular-shaped permanent magnets 24 in a slightly pressed state, wherein magnet storage portions 67a are exposed in the direction of rotational axis X (laterally outwardly in this case). When the annular body 67 is mounted to the left crank 27b, the magnet storage portions 67a are disposed equidistant from and concentric with the rotational axis X. The annular body 67 is fastened to the left crank arm 27b by mounting bolts 69 screwed into two screw holes 27f formed in an end face 27e of crank axle mounting boss 27d. Cam rollers 69a are mounted to the mounting bolts 69 for operating the front derailleur 26 using the rotational force of the crank arm.

The cover member 68 is used to block the magnet storage portions 67a to prevent the magnets 24 from falling out, and it has an opening 68a and four latching pawls 68b. Opening 68a is dimensioned for receiving the crank axle mounting boss 27d therethrough. The latching pawls 68b are formed at the face of the cover member 68 and are evenly spaced in the circumferential direction. Latching pawls 68b extend into pawl latching openings 67d formed in the annular body 67 to detachably fix cover member 68 to annular body 67. In this embodiment, cover member 68 completely covers the magnet storage portions 67a.

The reed switch 25 is fastened to a first control unit 30 mounted to the bottom bracket portion 65. The reed switch 25 is located such that it successively faces each magnet 24 with a predetermined gap therebetween as the left crank arm 27b rotates.

Since the magnets 24 are disposed in the preformed magnet storage portions 67a, the position of the magnets 24 can be set correctly simply by mounting the annular body 67 to the left crank arm 27b. Also, since the casing member 23 is fabricated from a nonmagnetic synthetic resin, the casing member 23 does not become magnetized, thus eliminating the risk of malfunction from spurious magnetic signals and minimizing the magnetic adherence of foreign objects. Furthermore, since the magnet storage portions 67a are completely covered by cover member 68, a foreign object, such as a magnetic body, is unlikely to adhere to a magnet 24 during travel.

Controller 11 manually controls the front and rear gear-shift mechanisms 8 and 9 and front and rear suspensions 13 and 14 in response to the operation of the gear-shift switches 20a and 20b and operating switches 21a and 21b. Controller 11 also may automatically control the front and rear gear-shift mechanisms 8 and 9 and front and rear suspensions 13 and 14 in accordance with the speed of the bicycle. First control unit 30 may delay a gear shift operation, for example, when it determines from the output of the rotation detector 22 that the crank 27b is not rotating at the time a gear change operation is desired.

Figure 6:
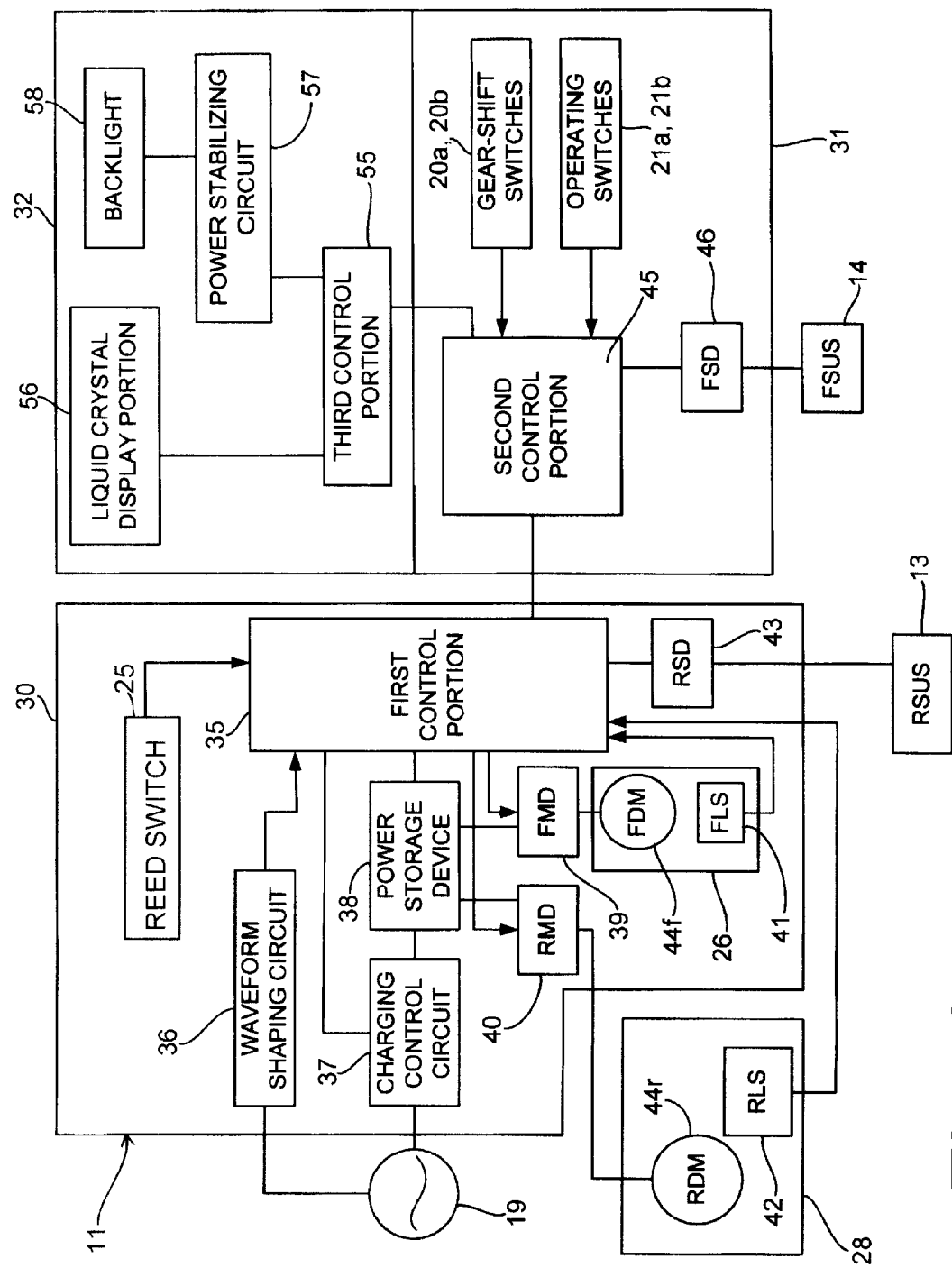
FIG. 6 is a block diagram of a particular embodiment of a control circuit that controls a plurality of bicycle components.

As shown in FIG. 6, controller 11 has a first control unit 30, a second control unit 31, and a third control unit 32. First control unit 30 may be integrally assembled with front derailleur 26 at the bottom bracket portion 65. First control unit 30 is connected to and is powered by the alternating current generator 19, and it powers and controls the front and rear derailleurs 26 and 28 and rear suspension 13. Since first control unit 30 is provided close to the alternating current generator 19, a shorter power cable may be used, thus increasing the efficiency of control signal exchanges and power supply.

The first control unit 30 includes a first control portion 35 in the form of a microcomputer, a waveform-shaping circuit 36 for generating a speed signal derived from the output of the alternating current generator 19, a charging control circuit 37, a power storage device 38, a front derailleur motor driver (FMD) 39, a rear derailleur motor driver (RMD) 40, a front derailleur 26 operating location (position) sensor (FLS) 41, a rear derailleur 28 operating location (position) sensor (RLS) 42, and a rear suspension motor driver (RSD) 43. The charging control circuit 37 rectifies the power output from the alternating current generator 19 and produces direct current power. The power storage device 38 may comprise a large-capacity capacitor, for example, for storing the direct current power produced by charging control circuit 37. If desired, the power storage device 38 may comprise a secondary storage battery such as a nickel cadmium battery, lithium ion battery, nickel hydride battery, etc. instead of a capacitor. The power stored in the power storage device 38 is communicated to the first control portion 35 and to the motor drivers 39, 40 and 43. The motor drivers 39, 40 and 43 output driving signals for driving motors 44f and 44r used to control derailleurs 26 and 28 and a motor (not shown in the figure) used to control the rear suspension 13 in accordance with control signals from first control portion 35.

The first control unit 30 also supplies power and control signals to the second control unit 31 and third control unit 32. More specifically, the first control unit 30 provides composite power/control signals that are pulsed ON and OFF. The control signals may include the speed signals from waveform-shaping circuit 36. The second control unit 31 and third control unit 32 derive power from the power signal components of the composite signals and are controlled according to control signal components of the composite signals.

The second control unit 31 is mounted via a bracket 50 (FIG. 2) to the handlebar 15 of the handlebar assembly 4. The second control unit 31 comprises gear-shift switches 20a and 20b, operating switches 21a and 21b, a second control portion 45 in the form of a microcomputer, and a front suspension motor driver (FSD) 46. The second control unit 31 transfers the operating data of switches 20a, 20b, 21a and 21b to the first control unit 30. In automatic mode, second control portion 45 adjusts the stiffness of the front suspension 14 in accordance with a control signal sent from the first control unit 30 based on bicycle speed. In manual mode, second control portion 45 adjusts the stiffness of the front suspension 14 in accordance with the operation of the operating switch 21b.

The third control unit 32 is a so-called cycle computer, and it is detachably mounted to the second control unit 31. The third control unit 32 has a third control portion 55 in the form of a microcomputer, a liquid crystal display portion 56, and a backlight 58. Backlight 58 is coupled to third control portion 55 through a power stabilizing circuit 57. The liquid crystal display portion 56 is capable of displaying various data such as speed, cadence, travel distance, gear-shift location, suspension status and so forth, and it is illuminated by the backlight 58.

In operation, the alternating current generator 19 of the dynamo hub 10 generates electric power when the bicycle is traveling, and the electric power is stored in the power storage device 38. Since the generator 19 is provided on the rear wheel 7, the power storage device 38 also may be charged by putting the bicycle on its stand and rotating the pedals if the charge produced by normal travel is insufficient. This is particularly helpful when adjusting the gear-shift mechanisms and setting the operations of the liquid crystal display portion 56.

When the bicycle speed either exceeds a predetermined threshold value or falls below a predetermined threshold value in automatic mode, a gear-shift operation is carried out. In this embodiment, the gear-shift operation is carried out with priority given to the rear derailleur 28. However, when it is determined by a lack of pulses from rotation detector 22 that the left crank arm 27b is not rotating, a gear shift operation may be delayed even when the speed exceeds the predetermined threshold value. Finally, when the speed exceeds a predetermined threshold value, the stiffness of both suspensions 13 and 14 may be made stiffer.

Figure 7:
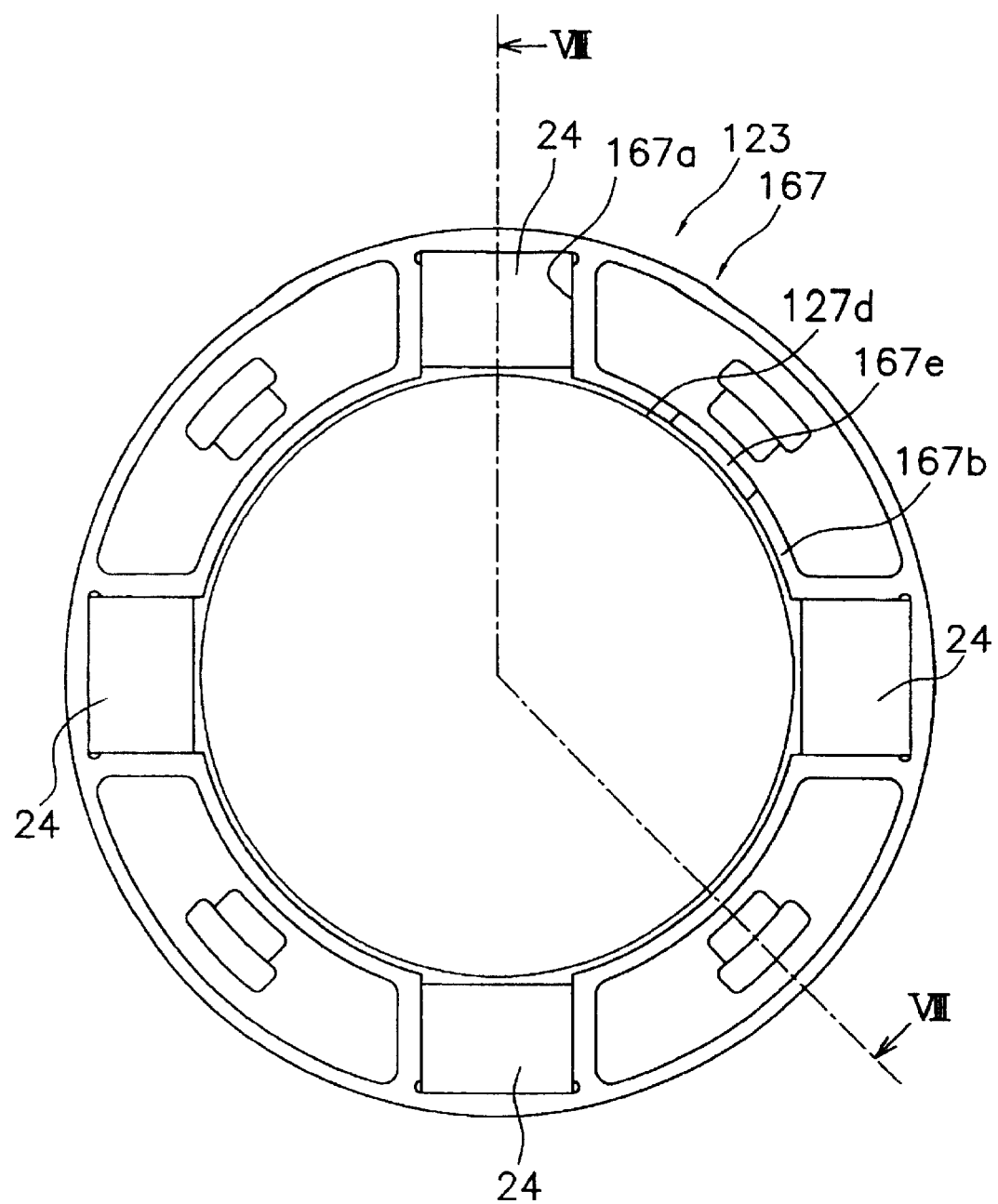
FIG. 7 is a front view of another embodiment of a casing member.
Figure 8:
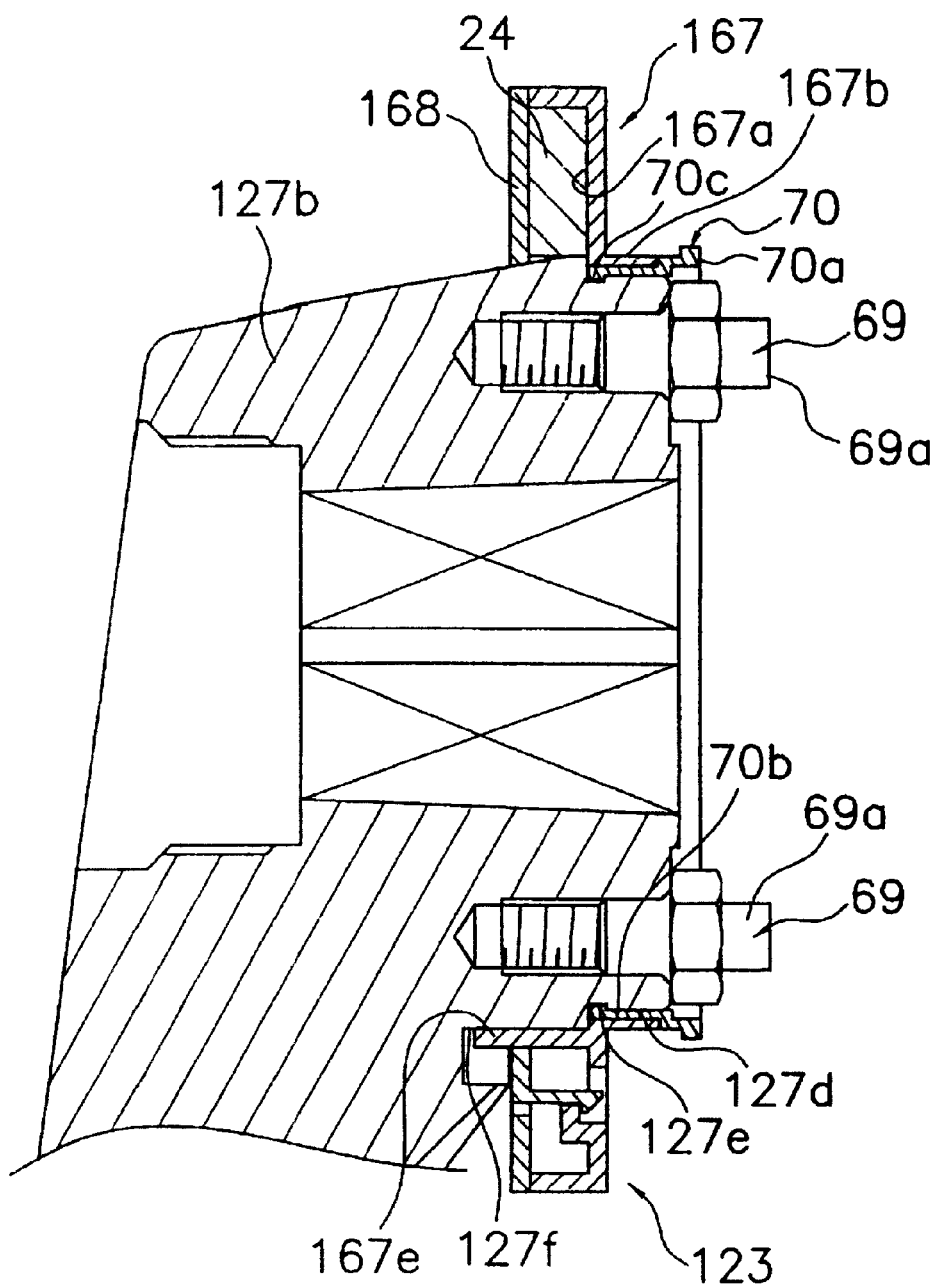
FIG. 8 is a view taken along line VIII—VIII in FIG. 7.

While the above is a description of various embodiments of inventive features, further modifications may be employed without departing from the spirit and scope of the present invention. For example, the casing member 23 in the embodiment described above was fastened to the left crank 27b by mounting bolts 69. However, as shown in FIGS. 7 and 8, an annular body 167 can be nonrotatably latched to a left crank arm 127b, and the annular body 167 can be prevented from falling off the left crank arm 127b by a stopper member 70. More specifically, a circular crank axle mounting boss 127d may be provided with an annular stopper groove 127e and an indented detent portion 127f, wherein annular stopper groove 127e is provided for latching the end of stopper member 70, and indented detent portion 127f is provided for stopping the rotation of the annular body 167.

In this embodiment, the annular body 167 comprises a tube portion 167b without a ring portion. A latching piece 167e axially protrudes from the tube portion 167b and latches to the indented detent portion 127f. Stopper member 70 is disposed between tube portion 167b and the crank axle mounting boss 127d. Stopper member 70 is a generally tubular member and comprises a flange portion 70a, which contacts with the end face of the tube portion 167b of the annular body 167; a cylindrical portion 70b disposed between the tube portion 167b and the crank axle mounting boss 127d; and a latching portion 70c that resiliently latches to the stopper groove 127e.

To mount casing member 123 to the left crank arm 127b, a cover member 168 is latched to the annular body 167 in the same manner described above for the first embodiment to block the magnets 24 mounted in the magnet storage portions 167a. Then, casing member 123 is mounted to the crank axle mounting boss 127d of the left crank 127b at the rotational position where the latching piece 167e aligns with the indented detent portion 127f. Finally, the stopper member 70 is mounted in the space between crank axle mounting boss 127d and the tube portion 167b from the right side in FIG. 8. As a result, the latching portion 70c fits into the stopper groove 127e, the flange portion 70a makes contact with the end face of the tube portion 167b, and the casing member 123 is prevented from falling off.

While the casing members 23, 123 of the rotation detector 22 were mounted to the left crank 27b or 127b in the described embodiment, the casing members 23, 123 also could be mounted to the right crank arm 27a. Furthermore, while a rotation detector 22 for detecting the rotation of a crank was described, a rotation detector for detecting the rotation of a wheel could be provided by mounting the casing member 23 to a wheel hub such as front wheel hub 6a or hub dynamo 10 as shown in FIG. 1. In that case, sensor 25 could be mounted to front fork 14, to a rear fork 2× of frame body 2, or to a chain stay (not shown) of frame body 2 in bicycles that employ such structures. Because the wheel hub is close to the axis of rotation of the wheel, the rotation detector can be made compact.

While a reed switch was used as magnetic sensor in the above embodiment, other sensors, such as a Hall-effect element, etc., also could be used. Furthermore, while a single magnetic sensor was disposed opposite a plurality of magnets, a plurality of magnetic sensors could be used to detect not only the presence or absence of rotation and rotational speed, but also the direction of rotation in accordance with which magnetic sensor is activated first.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. An apparatus used for detecting the rotation of a bicycle part, wherein the apparatus comprises:
   a casing member comprising:
      a separate generally annular body structured to be mounted to a mounting boss of the bicycle part other than a wheel spoke so that the annular body is incapable of rotating relative to the bicycle part as the bicycle part rotates in opposite directions around a rotational axis, wherein the annular body includes a plurality of circumferentially disposed exposed magnet mounting portions that are concentric with respect to the rotational axis and are fixed relative to each other during rotation of the casing member; and a cover member detachably mounted to the annular body for blocking the plurality of magnet mounting portions;

wherein the casing member further comprises:

an inner peripheral surface to fit around an outer peripheral surface of the mounting boss; and a surface that extends radially inwardly relative to the inner peripheral surface and is nonrotatably connected to the inner peripheral surface to face an axially facing surface of the mounting boss.

2. The apparatus according to claim 1 further comprising a plurality of magnets correspondingly mounted in the plurality of magnet mounting portions.

3. The apparatus according to claim 1 wherein the cover member rotates together with the annular body.

4. The apparatus according to claim 1 wherein the casing member is made from a nonmagnetic material.

5. The apparatus according to claim 4 wherein the casing member is made from a synthetic resin.

6. The apparatus according to claim 1 wherein the cover member completely covers the plurality of magnet mounting portions.

7. The apparatus according to claim 1 wherein the annular body is structured to be securely fixed to the bicycle part so that the annular body is incapable of rotating relative to the bicycle part.

8. The apparatus according to claim 7 wherein the annular body is structured to be securely fixed to the bicycle part so that the annular body is incapable of axial movement relative to the rotating part.

9. The apparatus according to claim 8 wherein the annular body is structured to be bolted to the bicycle part.

10. The apparatus according to claim 1 wherein the cover member is latched to the annular body.

11. The apparatus according to claim 1 further comprising a stopper member for fixing the annular body to the bicycle part.

12. The apparatus according to claim 11 wherein the stopper member is structured to fit radially inwardly of the annular body.

13. The apparatus according to claim 12 wherein the stopper member comprises:

a tubular portion structured to fit radially inwardly of the annular body; and a flange portion that axially retains the annular body.

14. The apparatus according to claim 13 wherein the stopper member further comprises a latching portion structured to fit within a stopper groove formed in the bicycle part.

15. The apparatus according to claim 1 further comprising a magnetic sensor structured to be mounted to a part of the bicycle.

16. The apparatus according to claim 15 wherein the part of the bicycle is one of a front fork, a back fork or a chainstay of the bicycle.

17. The apparatus according to claim 15 wherein the bicycle part is a wheel hub.

18. An apparatus used for detecting the rotation of a bicycle part, wherein the apparatus comprises:

a casing member comprising:

a separate generally annular body structured to be mounted to a mounting boss of the bicycle part other than a wheel spoke so that the annular body is incapable of rotating relative to the bicycle part as the bicycle part rotates in opposite directions around a rotational axis, wherein the annular body includes a plurality of circumferentially disposed exposed magnet mounting portions that are concentric with respect to the rotational axis and are fixed relative to each other during rotation of the casing member; and a cover member detachably mounted to the annular body for blocking the plurality of magnet mounting portions;

wherein the casing member further comprises:

an inner peripheral surface to fit around an outer peripheral surface of the mounting boss; and a surface that extends radially inwardly relative to the inner peripheral surface to face an axially facing surface of the mounting boss;

wherein the casing member is structured to be directly mounted to a crank arm.

19. The apparatus according to claim 18 wherein the casing member is structured to be directly mounted to a crank axle mounting boss of the crank arm.

20. The apparatus according to claim 19 wherein the casing member is structured to be directly bolted to the crank axle mounting boss of the crank arm.

21. The apparatus according to claim 19 wherein the annular body comprises:

a tube portion structured to be mounted around an outer peripheral surface of the crank axle mounting boss; and a ring portion structured to be mounted around an end face of the crank axle mounting boss.

22. The apparatus according to claim 21 wherein the ring portion includes a plurality of holes for receiving a corresponding plurality of bolts therethrough.

* * * * *